United States Patent Office 3,311,634
Patented Mar. 28, 1967

3,311,634
CERTAIN NORBORNENE-(ANE)
DICARBOXIMIDES
George Ireland Poos, Ambler, Pa., assignor to McNeil Laboratories, Incorporated, a corporation of Pennsylvania
No Drawing. Filed Mar. 5, 1965, Ser. No. 437,593
28 Claims. (Cl. 260—294)

This is a continuation-in-part of application Ser. No. 114,288, filed June 2, 1961 now abandoned which is a continuation-in-part of application Ser. No. 26,443, filed May 3, 1960, now abandoned.

This invention relates to a new series of organic compounds. More particularly, the present invention is concerned with 7-Y-N-$R_3$-($R_4$-5-norbornene)-2,3-dicarboximides and the corresponding norbornanes having the formulae

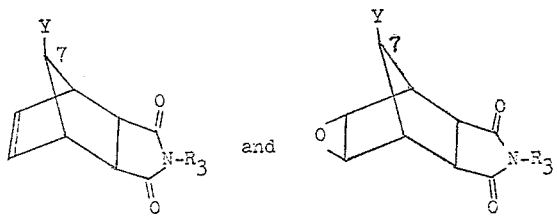

wherein Y is a member selected from the group consisting of $R_1$,

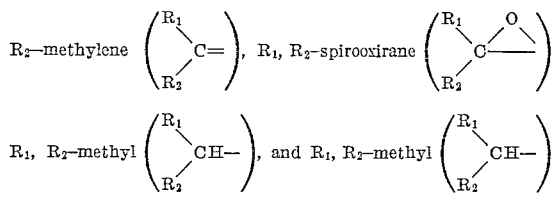

wherein the 7-carbon of the norbornene(ane) is further substituted with hydroxyl. The $R_3$ substituents, other than hydrogen, are attached to the imide nitrogen by means of a single carbon-nitrogen bond, and the $R_4$ substituents, when other than hydrogen, are attached to one or more of the available carbons on the ring nucleus.

$R_1$ and $R_2$ may be the same or different substituted or unsubstituted carbocylic radicals, such as cyclohexyl, phenyl, tolyl or naphthyl. Substituents in these aromatic nuclei may be, for example, hydroxyl; lower alkyl radicals, e.g., methyl, ethyl, propyl, butyl or pentyl; lower alkoxy radicals, e.g., methoxy, propoxy, ethoxy, ispropoxy, butoxy, isobutoxy, pentoxy, isopentoxy or hexoxy; lower alkenyloxy radicals, for example, allyloxy; halogen atoms, for example, chloro, bromo, fluoro or iodo; amino groups, especially tertiary amino groups, such as di-lower alkylamino groups, for example, dimethyl-, diethyl-, or dibutylamino; or amino-lower alkoxy groups, such as dilower alkylaminoloweralkoxy groups, for example, dimethylaminoethoxy. In these groups, the same or different aromatic lower carbocyclic nucleus may contain identical or different substituents which may occupy the same or different positions in the nuclei.

$R_2$ may also be saturated or unsaturated aliphatic containing 1 to 7 carbon atoms, i.e., a lower alkyl radical such as, for example, methyl, ethyl, propyl, propenyl, isopropyl, isopropenyl, butyl, butenyl, isobutyl, isobutenyl, pentyl, isopentyl, etc., which may, if desired, contain one or more further substituents as, for example, an hydroxy or amino group.

$R_1$ and $R_2$ may further be heterocyclic substituents containing from 4 to 5 carbon atoms interrupted by oxygen, nitrogen or sulfur linkages as, for example, pyrrolidyl, piperidyl, morpholyl, thiamorpholyl, pyridyl, thienyl, furyl, piperazinyl, etc., and aralkyl substituents as, for example, benzyl, phenethyl.

$R_3$ may be hydrogen; lower alkyl; carbamoyl; hydroxylower alkyl as, for example, hydroxymethyl, hydroxyethyl, hydroxybutyl, hydroxypropyl, hydroxypentyl, etc.; a heterocyclic moiety containing from 4 to 5 carbon atoms interrupted by oxygen, nitrogen or sulfur linkages (as defined above); aralkyl, for example, benzyl or phenylethyl; or aralkenyl, for example, styryl; an aryl or substituted aryl carbonylloweralkyl, such as α-methyl phenacyl or phenylcarbonylethyl; aminoloweralkyl, such as aminoethyl; loweralkylaminoloweralkyl, such as dimethylaminoethyl.

$R_4$ may be any one or more of the substituents defined hereinabove for $R_1$, $R_2$ and $R_3$, including hydrogen. Further, it may be lower alkenyl for example, allyl or methallyl; lower alkynyl for example, propargyl; cycloalkyl for example, cyclopentyl or cyclohexyl; cycloalkyl lower alkyl, for example cyclopentylpropyl or cyclohexylethyl. Where $R_4$ is a lower hydrocarbon group such as one of those defined hereinabove, it may contain further substituents such as nitro, amino, hydroxyl groups or halogen atoms. The hydroxyl groups may be free, etherified or esterified, as for example, methoxy or ethoxy groups. Amino and hydroxyl substituents may be linked to the lower hydrocarbon group (represented by $R_4$) or they may be attached directly to the ring, i.e., they may be $R_4$. In either case, such substituents may be primary, secondary, or tertiary amino groupings as, for example, lower-alkylamino, or di-lower alkylamino, i.e., dimethylamino, diethylamino, N-cyclopentyl-N-methylamino, N-benzyl-N-methylamino, pyrrolidino, piperidino, 4-methylpiperidino, morpholino, thiamorpholinopiperazino, 4-methylpiperazino, 4-hydroxyethylpiperazino. $R_4$ may be, if desired, an oxygen atom attached through single bonds to each of the 5- and 6-positions of the norbornene-(ane) nucleus, it represents the oxygen residue of an epoxy group.

As used herein, loweralkyl may be straight or branch chained and have from 1 to 6 carbon atoms, such as, for example, methyl, ethyl, propyl, isopropyl, butyl, isobutyl, tertiary butyl and the like.

As used herein, pyridyl represents 2-pyridyl, 3-pyridyl or 4-pyridyl. In the same manner, N-loweralkylpiperidyl represents 2-N-loweralkylpiperidyl, 3-N-loweralkylpiperidyl and 4-N-loweralkylpiperidyl.

In the compounds of this invention wherein there is a basic nitrogen, the acid addition salts derivatives may be prepared and are within the scope of this invention.

The therapeutically active non-toxic acid addition salts of such compounds are prepared by treatment with an appropriate acid such as an organic acid, e.g., hydrochloric, hydrobromic, hydriodic, sulfuric, nitric or phosphoric; an organic acid such as acetic, propionic, glycolic, lactic, pyruvic, malonic, succinic, maleic, malic, fumaric, tartaric, citric, benzoic, mandelic, cinnamic, methane sulfonic, benzene sulfonic, salicyclic, 2-phenoxybenzoic. Conversely, the salt form may be converted in the usual manner into the free base.

In the compounds of this invention wherein there is a basic nitrogen, the quaternary ammonium compounds may be prepared and are within the scope of this invention.

Such compounds may be converted into the corresponding quaternary ammonium compounds by reaction of the tertiary bases with alkylating agents, i.e., alkyl or aralkyl halides or esters formed by reacting alkanols with an oxygen-containing acid such as methyl iodide, ethyl bromide, propyl chloride; lower alkenyl halides—allyl bromide; dilower alkylsulfates—dimethylsulfate, diethylsulfate; lower alkylarylsulfonates—methyl p-toluenesulfonate or aralkyl halides—benzyl chloride. The quaternizing reaction may be performed in the presence or absence of a solvent, at room temperature or under cooling, at atmospheric pressure or in a closed vessel under pressure. Suitable solvents for this purpose are ethers such as diethylether and tetrahydrofuran, hydrocarbons such as benzene and heptane, ketones such as acetone and butanone, lower alkanols such as ethanol, propanol or butanol; or organic acid amides such as formamide or dimethylformamide. When lower alkyl halogenides are used as quaternizing agents, diethyl ether and benzene are the preferred solvents.

The compounds of the present invention may be obtained by means of a novel, practical method and it is intended that this method be included within the scope of the present invention.

In a general way, the process comprises ring closure of the corresponding 7-Y-2-carboxamido-5-norbornene-3-carboxylic acids or the corresponding norbornane acid, as the case may be wherein $R_1$ and $R_2$ are defined above. This may be advantageously accomplished by heating the acid in the presence or absence of an inert organic solvent such as hydrocarbon or halogenated hydrocarbon, for example, toluene, benzene, xylene, hexane, heptane, tetrahydrofuran, dioxane, diethylether, chlorobenzene, carbon tetrachloride, chloroform, etc. The temperature conditions may vary from 50° C. up to the boiling point of the particular solvent employed. Means other than heat may be used to effectuate ring closure. These include treatment with suitable dehydrating agents such as polyphosphoric acid, phosphoric acid, phosphorous oxyhalides, phosphorous halides, thionyl chloride or phosphorous pentoxide; acid anhydrides such as acetic anhydrides or propionic anhydride; organic acid chlorides such as acetyl chloride, or benzoylchloride. Ring closure, if desired, may also be advantageously accomplished by treatment of the acid with one of the above-mentioned dehydrating agents in the presence of an inorganic or organic base, for example, an alkali- or alkaline earth metal hydroxide, carbonate or bicarbonate, e.g., potassium hydroxide, sodium hydroxide, sodium or potassium carbonate or bicarbonate or the corresponding calcium compounds. Also suitable for this purpose are the salts of organic acids, for example, alkali- and alkaline earth metal salts of weak organic acids such as sodium acetate, potassium acetate or calcium propionate, or tertiary amines such as pyridine, trimethylamine, triethylamine, etc.

Alternatively, the novel dicarboximides may be prepared by reacting a 6,6-disubstituted fulvene, e.g., diphenylfulvene with maleimide or an appropriately N-substituted maleimide. The reaction is conducted in the absence or presence of a suitable inert organic solvent such as, for example, benzene, toluene, xylene, dioxane, etc., at room temperature, i.e., 25° C. to 30° C. or, if desired, at an elevated temperature. Depending upon the nature of the maleimide employed, the dicarboximide end product may be substituted or unsubstituted at the N-position. If the starting material does include a substituent at the nitrogen, e.g., a carbamoyl group, and it is desired to remove it after the dicarboximide has been obtained, such may be accomplished by suitable means such as, for example, by hydrolysis or alcoholysis. Alternatively, if the starting material does not include a substituent at the nitrogen, the appropriate $R_3$ group (supra) may be attached to the end product by alkylation.

The 7-Y-2-carboxamido-5-norbornene-3-carboxylic acids and the corresponding norbornane acids are prepared from the known 7-Y-5-norbornene-2,3-dicarboxylic anhydrides by splitting the anhydride under appropriate alkaline conditions as, for example, in the presence of an amine such as an alkylamine, i.e., methylamine, ethylamine or propylamine, in the presence of a suitable inert organic solvent, such as an alkanol, i.e., methanol, ethanol, propanol, acetone, an ether or a hydrocarbon such as benzene, toluene, xylene, hexane and mixtures thereof with each other, with water or both.

If the compounds of this invention contain a carbon-carbon double bond either in the ring or at the extra-cyclic Y-position, or both, and it is desired to remove either one or both of these double bonds (as the case may be) this may be accomplished by reduction with hydrogen in the presence of a catalyst selected from the metals of the eighth group of the periodic system, such as nickel, palladium, platinum, ruthenium or rhodium, which may be supported on a carrier such as barium carbonate or charcoal. Reduction of this nature is conducted in the presence of a solvent, such as an alkanol, for example, methanol or ethanol, and, if so desired, under pressure.

In addition, where the starting material employed contains a carbon-carbon double bond either in the ring or at the extra-cyclic Y-position, or both, these doubly bonded carbon atoms may be converted to form an epoxy group by reacting the unsaturated compound with an organic peracid such as perbenzoic acid, monoperoxyphthalic acid, pertrifluoroacetic acid and the like. Further, if desired, the epoxy substituent may be cleaved to form the hydroxy derivative by treating the aforementioned epoxy compound with hydrogen in the presence of a catalyst selected from the metals of the eighth group of the periodic system, such as nickel, palladium, platinum, ruthenium or rhodium, which may be supported on a carrier such as barium carbonate or charcoal. Reduction of this nature is conducted in the presence of a solvent, such as an alkanol, for example methanol or ethanol and, if so desired, under pressure.

Depending upon the reaction conditions or starting materials employed, the dicarboximidyl moiety may be either in the "exo" or "endo" configuration with respect to the bicyclic nucleus in three-dimensional representation. It is to be understood, therefore, that the novel compounds, as generically described and claimed, are intended to embrace both these configurations, it being well within the purview of one skilled in the art to determine which end configuration is desired by initiating the process with the appropriate starting material. The examples given below are, therefore, to be understood as illustrations of discrete species, not as limitations upon the scope of the invention or as restricted exemplifications of "exo" or "endo" configurations of a given compound.

The novel compounds of the present invention are useful as intermediates in the preparation of 2-$R_3$-3a,4,7,7a-tetrahydro-4,7-(Y)$R_4$-isoindolines, the corresponding 3a,-4,5,6,7,7a-hexahydro compounds, their oxides, therapeutically active acid addition salts and quaternary ammonium compound. Conversion of the novel 7-Y-N-$R_3$-5-norbornene-$R_4$-2,3-dicarboximides and the corresponding norbornanes to the tetrahydro- and the hexahydroisoindolines is suitably accomplished by treatment with a reducing agent. Suitable for this purpose are the di-light metal hydrides such as alkali metal aluminum hydrides, for example lithium aluminum hydride; alkali metal borohydrides, for example lithium, sodium or potassium borohydride. These hydrides may be employed in the presence of suitable solvents such as ethers, for example diethylether, dibutylether, tetrahydrofuran or dioxane.

The 2 - $R_3$-3a,4,7,7a-tetrahydro-4,7-(Y)$R_4$-isoindolines and the corresponding 3a,4,5,6,7,7a - hexahydro compounds, their therapeutically active acid addition salts and quaternary ammonium compounds are described in detail in co-pending application Ser. No. 114,287, filed June 2, 1961, now issued as U.S. 3,100,776, which is a continuation-in-part of Ser. No. 26,442, filed May 3, 1960, now abandoned. The compounds are useful in the treatment of peptic ulcer. This property has been demonstrated by inhibition of ulcer production in the rat by the method of Shay and also in ulcers produced by the method of restraint. In actual use, the final products which are preferable from the claimed compounds may be employed in doses from about 0.5 to about 50 milligrams per kilogram body weight and may be used in the form of pharmaceutical preparations which contain the compounds, their addition salts, quaternary ammonium compounds, their N-oxides in admixture with pharmaceutical organic or inorganic solvents or liquid carriers suitable for oral or parenteral administration.

In the norbornene-(ane) dicarboximides of this invention when $R_1$ or $R_2$ is aromatic, or both are aromatic, and Y is an $R_1$, $R_2$-methylene function, the compounds are useful as ultraviolet absorbers. In addition, certain of the dicarboximides shown CNS depressant activity and certain of them show anti-inflammatory activity.

The following examples are illustrative of, but not limitative on, the novel aspects of this invention.

*Example I*

To a solution of sodium ethoxide prepared by adding 11.5 parts by weight of sodium to 300 parts by volume of absolute ethanol under nitrogen is added 91.2 parts by weight of benzophenone followed by a solution of 57.6 parts by weight of freshly prepared cyclopentadiene in 100 parts by volume of absolute ethanol. The addition is carried out with good stirring for a period of about ten minutes, during which time the undissolved benzophenone dissolves, yielding a dark red solution. After about ten minutes of stirring at room temperature, the product begins to crystallize from the solution and after stirring an additional one and one-half hours at room temperature, the mixture is cooled in an ice-bath and kept at 0° C. for one-half hour. The product is then collected on a filter, washed with several portions of absolute alcohol, and dried, yielding diphenylfulvene, melting point 79.5° C. to 82° C. Concentration of the mother liquor yields a second crop. The two crops are combined and recrystallized from absolute alcohol to provide a pure diphenylfulvene, melting point 81° C. to 82° C.

*Example II*

A solution of 36.5 parts by weight of diphenylfulvene and 15.5 parts by weight of maleic anhydride in 160 parts by volume of benzene is heated under reflux for a period of about twenty minutes. The solution is cooled in an ice-bath, the precipitated solid diluted with petroleum ether and the resulting slurry collected on a filter, washed with petroleum ether and is dried. There is obtained endo - 7-diphenylmethylene-5-norbornene-2,3-dicarboxylic anhydride, melting point 151° C. to 158° C.

*Example III*

To 300 parts by volume of methanol cooled below 0° C. in an acetone Dry-Ice bath is added a solution of 10 parts by volume of methylamine in 50 parts by volume of cold methanol. To the resulting solution, cooled in an ice-bath with stirring, is added 42.2 parts by weight of endo-7 - diphenylmethylene-5-norbornene-2,3-dicarboxylic anhydride. The ice-bath is removed, and the mixture is allowed to come to room temperature and then to stand overnight. The solution is concentrated to dryness, the residue is slurried in water, and the resulting aqueous suspension made acidic with dilute hydrochloric acid. The precipitated acid is collected on a filter, washed with water, and dried, yielding 7-diphenylmethylene-endo-2-methylcarbamido - 5-norbornene-endo-3-carboxylic acid, melting point 160° C. to 165° C.

*Example IV*

To a mixture of 750 parts by volume of toluene and 150 parts by volume of 2-propanol is added 27.5 parts by weight of 7-diphenylmethylene-endo-2-methylcarbamido-5-norbornene-endo-3-carboxylic acid. The resulting solution is heated to boiling and the 2-propanol is slowly distilled from the mixture. After one and one-half hours all of the 2-propanol has been distilled and the remaining solution is heated under reflux for an additional two hours. The reaction solution is concentrated to dryness under reduced pressure and the residual oil is dissolved in methylene chloride, diluted with ether and distilled to remove the bulk of the methylene chloride. Upon cooling the solution, the crystalline product separates. It is collected on a filter, washed with ether-petroleum ether and dried to give endo-7-diphenylmethylene-5-norbornene-N-methyl - 2,3 - dicarboximide, melting point 171° C. to 174° C.

*Example V*

To a slurry of 9.5 parts by weight of lithium aluminum hydride in 500 parts by volume of anhydrous ether is added rapidly, dropwise, a solution of 17.5 parts by weight of endo - 7 - diphenylmethylene - 5 - norbornene - N-methyl-2,3-dicarboximide in 1500 parts by volume of anhydrous ether. The mixture is heated under reflux for two and one-half hours and is allowed to stand at room temperature overnight. To the reduction mixture is added carefully dropwise 50 parts by volume of ethyl acetate and then 20 parts by volume of water. The mixture is stirred at room temperature for three hours and then filtered. The remaining inorganics are washed with ether and the combined organic solution is dried over magnesium sulfate, filtered and concentrated to dryness under reduced pressure to give endo - 8 - diphenylmethylene-2 - methyl - 3a,4,7,7a-tetrahydro-4,7-methanoisoindoline, melting point 74° C. to 77° C. The base is combined in methanol with 4.8 parts by weight of fumaric acid and the solution is diluted with ether, which affords crystals. The solid is filtered, washed three times with ether, and dried, yielding endo - 8 - diphenylmethylene - 2 - methyl-3a,4,7,7a - tetrahydro - 4,7-methanoisoindoline fumarate, melting point 203.5° C. to 205.5° C. (dec.).

*Example VI*

To a boiling solution of 1.96 parts by weight of maleic anhydride in 30 parts by volume of xylene is added rapidly, dropwise, a solution of 4.6 parts by weight of diphenylfulvene in 36 parts of xylene. The solution is heated under reflux for five hours and then concentrated to dryness under vacuum. The addition of ether to the residue causes crystals to separate which are collected by filtration, washed with ether and dried to provide a mixture of adducts, melting point 148° C. to 155° C., containing largely the endo-isomer. Concentration of the mother liquors and cooling provides a second, larger quantity of product, melting point 135° C. to 142° C., which is largely the desired exo - 7 - diphenylmethylene - 5- norbornene-2,3-dicarboxylic anhydride.

*Example VII*

A solution of 0.6 parts by volume of methylamine in 20 parts by volume of methanol cooled below 0° C. in an acetone-dry-ice bath is treated with 2.5 parts by weight of exo - 7 - diphenylmethylene - 5 - norbornene - 2, 3-dicarboxylic anhydride. The cold bath is removed, and the solution is allowed to come to room temperature and to stand for one hour. The solution is concentrated to dryness under vacuum and the residue is partitioned between methylene chloride and dilute hydrochloric acid. Separation of the organic layer followed by drying over anhydrous magnesium sulfate and concentration to dryness gives 7 - diphenylmethylene - exo - 2 - methylcarbamido-5-norbornene-exo-3-carboxylic acid, melting point 98° C. to 106° C. (dec.).

*Example VIII*

A solution of 0.9 parts by weight of 7-diphenylmethylene - exo - 2 - methylcarbamido-5-norbornene-exo-3-carboxylic acid in a mixture of 20 parts by volume of benzene and 10 parts by volume of absolute ethanol is heated under reflux for two hours and then concentrated to dryness under vacuum. The residue is dissolved in methylene chloride and the resulting solution is washed with 5% sodium carbonate solution, dried over anhydrous magnesium sulfate and concentrated to dryness. Crystallization of the residue from methylene chloride-ether gives exo - 7 - diphenylmethylene - 5-norbornene-N-methyl-2,3-dicarboximide, melting point 154° C. to 157° C.

Example IX

A mixture of 1.1 parts by weight of lithium aluminum hydride in 50 parts by volume of anhydrous ether is treated rapidly dropwise with stirring with a solution of 2.0 parts by weight of exo-7-diphenylmethylene-5-norbornene-N-methyl-2,3-dicarboximide in 150 parts by volume of anhydrous ether. The mixture is heated under reflux for three hours, cooled and carefully treated, dropwise, with stirring with 5 parts by volume of water. After stirring for three hours, the mixture is filtered and the insolubles are washed with ether. The combined filtrate and washings are dried over magnesium sulfate and evaporated to dryness to give exo-8-diphenylmethylene-2-methyl-3a,4,7,7a-tetrahydro-4,7-methanoisoindoline. The base is dissolved in hot 2-propanol and treated with 0.52 parts of fumaric acid in 2-propanol. Cooling the solution provides crystals. The solid is filtered, washed with 2-propanol and then ether, and dried, yielding exo-8-diphenylmethylene-2-methyl - 3a,4,7,7a - tetrahydro - 4,7 - methanoisoindoline fumarate, melting at 176° C. to 178° C.

Example X 4.6 parts by weight of diphenylfulvene and 2.5 parts by weight of N-ethylmaleimide are combined in 20 parts by volume of benzene and left to stand at room temperature for four days. The solution is concentrated to dryness under reduced pressure and the residue is dissolved in ether. Upon cooling, crystals separate from the solution. The crystals are collected by filtration, washed with ether and dried to give endo - 7 - diphenylmethylene - N- ethyl-5-norbornene-2,3-dicarboximide, melting point 125° C. to 126° C. Concentration of the mother liquors followed by addition of petroleum ether affords a second crop melting at 110° C. to 115° C.

Example XI

A solution of 14 parts by weight of endo-7-diphenylmethylene-N-ethyl-5 - norbornene - 2,3 - dicarboximide in 1200 parts by volume of anhydrous ether is added dropwise to a mixture of 7.7 parts by weight of lithium aluminum hydride in 500 parts by volume of anhydrous ether. After the addition the solution is heated under reflux for two hours and then allowed to stand at room temperature overnight. The reaction mixture is hydrolyzed by the cautious dropwise addition of 23 parts by volume of water and is then allowed to stir at room temperature for two and one-half hours. The mixture is filtered and the inorganic salts are washed thoroughly with ether. The filtrate is dried over anhydrous magnesium sulfate, filtered, and concentrated to dryness under reduced pressure. There is obtained a light yellow viscous oil. On standing this product slowly crystallizes. It is dissolved in petroleum ether and cooled until formation of crystals is complete. The crystals are collected, washed with petroleum ether and dried. There is obtained endo-8-diphenylmethylene-2-ethyl-3a,4,7,7a - tetrahydro-4,7-methanoisoindoline, melting point 88° C. to 92.5° C. Recrystallization from petroleum ether affords a purified product melting at 90.5° C. to 92.5° C.

Example XII

A solution of 7.4 parts by weight of beta-phenethylamine in 175 parts by volume of methanol is cooled to 0° C. and treated in portions with 20 parts by weight of diphenylfulvene maleic anhydride condensation product (Example II above). After the addition is complete, the solution is allowed to warm to room temperature and to stand for three hours. The solution is then concentrated under reduced pressure to a low volume and diluted with water. Addition of a small amount of dilute hydrochloric acid completes precipitation of the product, which is collected on a filter, washed with water, and dried. There is obtained 24 parts by weight of endo-7-diphenylmethylene-endo-2-(N-beta-phenethylcarbamido)-5 - norbornene-endo-3-carboxylic acid, melting point 131.5° C. to 133° C.

Example XIII

Endo-7-diphenylmethylene-endo-2-(N-beta - phenethylcarbamido)-5-norbornene - endo - 3 - carboxylic acid (23 parts by weight) in 200 parts by volume of toluene is heated under reflux for four hours. Concentration of the solution to dryness yields a gummy residue which is induced to crystallize with ether. The product is collected on a filter, washed with ether and dried. There is obtained endo-7-diphenylmethylene-N-beta-phenethyl-5-norbornene-2,3-dicarboximide, melting at 171° C. to 174° C.

Example XIV

A sample of endo-7-diphenylmethylene-5-norbornene-2,3-dicarboximide (2.5 parts by weight) is added to a solution of 0.54 parts by weight of potassium hydroxide in 15 parts by volume of water and 30 parts by volume of ethanol. To this solution is added 1.53 parts by weight of beta-phenethylbromide. The solution is stirred overnight at room temperature. Additional potassium hydroxide and beta-phenethylbromide are added and the solution is refluxed for two and one-half hours. The solution is concentrated in vacuo to one-half volume. The crystalline product is filtered and recrystallized from methanol giving 1.5 parts by weight of endo-7-diphenylmethylene-N-beta-phenethyl-5 - norbornene - 2,3 - dicarboximide, melting point 174° C. to 176° C.

Example XV

A solution of 4 parts by weight of endo-7-diphenylmethylene-2-beta-phenethyl-5-norbornene - 2,3 - dicarboximide in 75 parts by volume of anhydrous tetrahydrofuran is added rapidly dropwise to a suspension of 1.41 parts by weight of lithium aluminum hydride in 100 parts by volume of the same solvent. After the addition is complete, the mixture is heated under reflux for sixteen hours and then allowed to cool. The reduction mixture is hydrolyzed by the cautious addition of 4 parts by volume of water to the well-stirred reaction mixture, and the mixture is then allowed to stir for three hours. The precipitated inorganic salts are collected on a filter, washed thoroughly with ether, and the combined filtrate and washings are concentrated to dryness. The pale yellow gummy residue is combined with 50 parts by volume of 2-propanol and 0.82 parts by weight of maleic acid, and the resulting solution is diluted with ether, whereupon the crystals of the maleate precipitate. The crystals are collected on a filter, washed with ether, and dried, yielding endo-8-diphenylmethylene - 2 - beta-phenethyl - 3a,4,7,7a-tetrahydro - 4,7 - methanoisoindoline maleate, melting at 178° C. to 179° C.

Example XVI

A solution of 4.13 parts by weight of endo-7-diphenylmethylene-N-methyl-5-norbornene-2,3 - dicarboximide in 90 parts by volume of redistilled tetrahydrofuran is treated with 0.016 parts by weight of 10% palladium-on-carbon and submitted to hydrogenation at atmospheric pressure. The mixture is stirred until the uptake of hydrogen has slowed and a total of 303 parts by volume of hydrogen has been consumed. The solution is filtered from the catalyst and concentrated to dryness under reduced pressure. The residue is dissolved in methylene chloride and ether, filtered and concentrated. Addition of petroleum ether provides crystals which are collected on a filter, washed with petroleum ether and air-dried. There is obtained endo-7-diphenylmethylene-N-methyl-2,3-norbornane-dicarboximide, melting at 137° C. to 141.5° C.

Example XVII

A solution of 7.3 parts by weight of endo-7-diphenylmethylene-N-methyl-2,3-norbornane-dicarboximide in 600 parts by volume of dry ether is added dropwise with stirring to a mixture of 4.0 parts by weight of lithium aluminum hydride in 250 parts by volume of the same solvent. The mixture is heated under reflux for two hours and allowed to stand at room temperature overnight. Hydrolysis is accomplished by the dropwise addition of 12 parts by volume of water followed by stirring at room temperature for three hours. The inorganic salts are removed by filtration and washed thoroughly with ether, and the combined ethereal filtrate and washings are dried over anhydrous magnesium sulfate, filtered, and evaporated to dryness under reduced pressure. There results a light-colored gummy residue. A solution of this product in ether is treated with a solution of 2.5 parts by weight of fumaric acid in 50 parts by volume of methanol. Further dilution of this mixture with ether affords crystals, which are collected on a filter, washed with ether and dried. There are obtained white crystals of endo-8-diphenylmethylene-2-methyl-3a,4,5,6,7,7a-hexahydro-4,7-methanoisoindoline fumarate, melting at 191° C. to 192° C.

Example XVIII

A solution of 5 parts by weight of endo-7-diphenylmethylene-N-methyl-5-norbornene-2,3-dicarboximide in 75 parts by volume of methanol plus 50 parts by volume of methylene chloride is treated with 0.25 parts by weight of 10% palladium-on-carbon and subjected to hydrogen at three atmospheres pressure. After shaking the mixture for fifteen minutes an amount of hydrogen corresponding to the absorption of four atoms of hydrogen has been taken up. The solution is filtered from the catalyst and concentrated to dryness under reduced pressure. A solution of the residue in a mixture of methylene chloride and ether leads to crystals, which are collected on a filter, washed with ether and dried. After two recrystallizations from methanol-ether, pure endo-7-diphenylmethyl-N-methyl-2,3-norbornane-dicarboximide is obtained with a melting point of 206.5° C. to 209° C.

Example XIX

Lithium aluminum hydride (2 parts by weight) is added to 100 parts by volume of dry, freshly distilled tetrahydrofuran and to the resulting mixture with stirring is added a solution of 3.6 parts by weight of the imide described in Example XVIII in 300 parts by volume of the same solvent. After the addition is complete, the mixture is heated under reflux for five hours and then allowed to stand at room temperature overnight. Excess lithium aluminum hydride and the inorganic complexes are hydrolyzed by the cautious addition of 6 parts by volume of water. After the mixture has stood at room temperature for four hours, it is filtered and the precipitated inorganic salts are washed thoroughly with ether. The combined tetrahydrofuran filtrate and ethereal washes are concentrated to dryness under reduced pressure. The resulting basic product is dissolved in methanol and treated with a solution of 1.3 parts by weight of fumaric acid in methanol. Upon dilution with ether and cooling, crystals separate which are collected on a filter, washed with ether, and dried, yielding 3.7 parts by weight of endo-8-diphenylmethyl-2-methyl-3a,4,5,6,7,7a-hexahydro-4,7-methanoisoindoline fumarate with a melting point of 237° C. to 238° C.

Example XX

To a solution of 2.3 parts by weight of sodium in 100 parts by volume of absolute ethanol is added 21.7 parts by weight of p-chlorobenzophenone and 50 parts by volume of absolute ethanol. The solution is stirred until the ketone is almost dissolved and a solution of 11.6 parts by weight of freshly distilled cyclopentadiene in 25 parts by volume of cold absolute ethanol is added rapidly dropwise with stirring. The mixture is allowed to warm to room temperature and stir for four hours, during which time the remaining starting material dissolves and orange crystals of the product separate. The mixture is concentrated under reduced pressure to a volume of about 75 parts by volume, cooled in ice, and the crystalline product collected on a filter, washed with ethanol, and dried. There is obtained 19 parts by weight of 6-p-chlorophenyl-6-phenylfulvene, melting at 73° C. to 74° C.

Example XXI

A solution of 14.0 parts by weight of 6,6-p-chlorodiphenylfulvene and 4.61 parts by weight of maleimide in 120 parts by volume of benzene is refluxed for one and one-half hours and allowed to stand at room temperature for sixteen hours. The resultant mixture is diluted with petroleum ether. The crystals are collected on a filter, washed with ether and air-dried to give 14.8 parts by weight of endo-7-p-chlorodiphenylmethylene-5-norbornene-2,3-dicarboximide, melting point 205° C. to 207° C. Recrystallization from methylene chloride-ethyl acetate raises the melting point to 208° C. to 211° C.

Example XXII

A suspension of 13.8 parts by weight of endo-7-p-chlorodiphenylmethylene-5-norbornene-2,3-dicarboximide in 137 parts by volume of ethanol is treated with 2.45 parts by weight of potassium hydroxide in 71 parts by volume of water. The solution is stirred as 5.5 parts by weight of dimethylsulfate is added rapidly. The gummy mixture is stirred at room temperature for one hour and at reflux for one hour. It is then cooled, diluted with 120 parts by volume of ethanol and concentrated in vacuo at 35° C. The precipitate is removed by filtration, washed with ethanol and air-dried to give 13.6 parts by weight of endo-7-p-chlorodiphenylmethylene-N-methyl-5-norbornene-2,3-dicarboximide, melting at 127° C. to 134° C. A sample purified by recrystallization from methylene chloride-ether-petroleum ether shows a melting point of 132° C. to 136° C.

Example XXIII

To a mixture of 6.6 parts by weight of lithium aluminum hydride in 200 parts by volume of dry ether is added dropwise with stirring a solution of 12.6 parts by weight of the imide described in Example XXII in 500 parts by volume of dry ether. After the addition is complete, the reaction mixture is heated to boiling for two hours and then cooled to ice temperature. Hydrolysis is accomplished by the careful dropwise addition of 19.7 parts by volume of water to the stirring reaction mixture. After the water has been added, the mixture is allowed to stir for two hours and is then filtered from the precipitated inorganic salts which are washed with several portions of ether. The combined filtrate and washings are evaporated to dryness to yield a residual oil. A portion of this product (6.9 parts by weight) is converted to the maleate by solution in a small volume of acetone and treatment with a solution of 2.3 parts by weight of maleic acid in ether. The crystalline salt is collected on a filter and washed with ether to give 7.8 parts by weight of endo-8-p-chlorophenylmethylene-2-methyl-3a,4,7,7a-tetrahydro-4,7-methanoisoindoline maleate, melting at 160° C. to 161° C.

Example XXIV

To a solution of 900 ml. of absolute ethanol containing 48 g. (2.1 g. atoms) of dissolved sodium at ambient temperature is added 132 g. (2 moles) of freshly-cracked redistilled cyclopentadiene under a nitrogen atmosphere. To the resulting orange solution is added with stirring a solution of 183 g. (1.0 mole) of 2-benzoylpyridine in 500 ml. of absolute ethanol over a two hour period. A deep red color develops within a few minutes. The solution is allowed to stir an additional 15 minutes after the addition is completed at which time the solvent is removed in vacuo until a semi-solid mass results. The residue is treated with water (ca. 200 ml.) and ether (ca. 500–750 ml.) simultaneously until solution is complete. The ether layer is washed successively with water (2× 200) and saturated sodium chloride solution (1× 100). The ether layer is dried over anhydrous potassium carbonate and the ether is removed in vacuo to give a red glass upon cooling. Trituration of the glass with ether and scratching of the walls of the flask affords, in this instance, crystals of 3a,4,7,7a - tetrahydro - 1,8 - bis(α - 2 - pyridylbenzylidene) - 4,7 - methanoindene, 161 g. (70%) of crude product, M.P. 116–117.5° C. The product is recrystallized from ether; M.P. 116.5–132° C.

To 17.5 g. (0.18 mole) of maleimide dissolved in 500 ml. of benzene is added 41.5 g. (0.09 mole) of the product of the above reaction, in this instance, 3a,4,7,7a-tetrahydro - 1,8 - bis(α - 2 - pyridylbenzylidene) - 4,7-methanoindene. The solution is refluxed overnight. Upon cooling the product, 7 - (α - 2 - pyridylbenzylidene) - 5-norbornene - 2,3 - dicarboximide is obtained as white crystals; M.P. 219–222° C. Recrystallization from dioxane raises the M.P. to 222–225° C.

*Example XXV*

A solution of 1.67 parts by weight of potassium hydroxide in 48 parts by volume of water is added to a suspension of 8.0 parts by weight of 7 - (phenyl - 2 - pyridylmethylene) - 5 - norbornene - 2,3 - dicarboximide in 83 parts by volume of ethanol and the mixture is stirred until the imide dissolves. Dimethylsulfate, 2.54 parts by volume, is added rapidly and the product begins to precipitate in 5 minutes. The mixture is stirred for 2½ hours, when the pH is then 7, cooled in an ice-bath and the product is collected by filtration. It is washed well with 40% aqueous ethanol and oven-dried to constant weight giving 5.80 parts by weight of 7 - (phenyl - 2 - pyridylmethylene) - N - methyl - 5 - norbornene - 2,3 - dicarboximide, melting at 169–170° C.

*Example XXVI*

To a suspension of 6.5 parts by weight of lithium aluminum hydride in 200 parts by volume of anhydrous diethylether is added a solution of 11.7 parts by weight of 7 - (phenyl - 2 - pyridylmethylene) - N - methyl - 5-norbornene - 2,3 - dicarboximide in 700 parts by volume of ether and 190 parts by volume of dry tetrahydrofuran. The mixture is stirred at room temperature for 2 days and carefully decomposed with 19.5 parts by volume of water. The solids are removed by filtration, washed with ether and the combined filtrate and washes are concentrated to dryness giving 9.69 parts by weight of basic isoindoline product. The endo - 8 - phenyl - 2 - pyridylmethylene - 2 - methyl - 3a,4,7,7a - tetrahydro - 4,7-methanoisoindoline fumarate is prepared in isopropyl alcohol-ether and melts at 175–176° C.

*Example XXVII*

To a solution of 3.25 parts by weight of sodium in 100 parts by volume of absolute ethanol is added a solution of 33.44 parts by weight of m - trifluoromethylbenzophenone in 85 parts by volume of absolute ethanol. A solution of 15.5 parts by weight of freshly distilled cyclopentadiene in 20 parts by volume of ethanol is added rapidly. The solution is stirred at room temperature for 2½ hours. The solution is concentrated to one-half volume under vacuum, diluted with water and extracted 3 times with ether. The organic layer is dried over magnesium sulfate and the solvent is evaporated to give 6,6 - m - trifluoromethyldiphenylfulvene.

*Example XXVIII*

A solution of 39 parts by weight of 6,6 - m - trifluoromethyldiphenylfulvene and 12.7 parts by weight of maleimide in 200 parts by volume of benzene is heated under reflux for 2 and ¾ hours and allowed to stand at room temperature for 16 hours. The solvent is removed under vacuum and the product is crystallized from ether-petroleum ether, affording 35 parts by weight of endo-7-m - trifluoromethyldiphenylmethylene - 5 - norbornene-2,3 - dicarboximide, melting at 180–183° C. after recrystallization from methylene chloride-ether-petroleum ether.

*Example XXIX*

To a suspension of 31.5 parts by weight of endo-7-m-trifluoromethyldiphenylmethylene - 5 - norbornene - 2,3-dicarboximide in 320 parts by volume of ethanol is added a solution of 5.05 parts by weight of potassium hydroxide in 150 parts by volume of water. The mixture is heated gently to afford solution. At room temperature, 12.4 parts by weight of dimethylsulfate is added. The mixture is heated to reflux and cooled. The ethanol is removed under vacuum and the oily product is extracted into ether. The ether solution is washed with sodium bicarbonate and water. It is then dried over magnesium sulfate, filtered and concentrated to dryness in vacuo. A sample of the oily residue is taken up in ether and washed with dilute sodium hydroxide and water. The organic solution is dried over magnesium sulfate and concentrated in vacuo. After recrystallization from ether-petroleum ether, 5.7 parts by weight of endo-7-m-trifluoromethyldiphenylmethylene - N - methyl - 5 - norbornene - 2,3-dicarboximide is obtained, melting at 135–137° C.

*Example XXX*

To a suspension of 2.73 parts by weight of lithium aluminum hydride in 100 parts by volume of anhydrous ether is added slowly a solution of 5.85 parts by weight of endo - 7 - m - trifluoromethyldiphenylmethylene - N-methyl - 5 - norbornene - 2,3 - dicarboximide in 200 parts by volume of ether. The reaction mixture is stirred at room temperature for 23 hours and hydrolyzed by adding 8.2 parts by volume of water. The inorganics are removed by filtration; the filtrate is dried over magnesium sulfate and the solvent evaporated in vacuo.

The oily product is dissolved in ether and dilute hydrochloric acid. The ether solution is removed and further extracted with dilute hydrochloric acid. The combined acid fractions are made basic and extracted with ether. The ether extract is dried and concentrated in vacuo to give 4.4 parts by weight of oily product.

The oily base is combined with 1.35 parts by weight of maleic acid in acetone-ether. There is obtained 4.21 parts by weight of 8-m-trifluoromethyldiphenylmethylene-2-methyl - 3a,4,7,7a - tetrahydro - 4,7 - methanoisoindoline maleate with a melting point of 143–145.5° C.

*Example XXXI*

Under nitrogen 1.17 parts by weight of potassium is added to 120 parts by volume of dried t-butanol and is dissolved by heating under reflux for one hour. A solution of 5.90 parts by weight of o-methylbenzophenone in 10 parts by volume of t-butanol is added rapidly, followed by 4.45 parts by volume of freshly distilled cyclopentadiene. A white solid precipitates. The mixture is brought into solution by heating to reflux and is then stirred under nitrogen at reflux for 66 hours. The dark solution is diluted with water and extracted twice with ether. The ether extracts are washed with water and dried over magnesium sulfate. Concentration of the ether solution gives 6,6-o-methyldiphenylfulvene.

*Example XXXII*

A solution of 5.34 parts by weight of 6,6-o-methyldiphenylfulvene and 1.90 parts by weight of maleimide in 50 parts by volume of benzene is heated under reflux for 3 hours. After cooling and diluting with petroleum ether, the product crystallizes. The crystals are removed by filtration and washed with ether-petroleum ether to give 3.98 parts by weight of endo-7-o-methyldiphenylmethylene - 5 - norbornene - 2,3 - dicarboximide, melting point 184–190° C. After two recrystallizations from ether-petroleum ether, the product melts at 185–188.5° C.

*Example XXXIII*

To a suspension of 20.0 parts by weight of endo-7-o-methyldiphenylmethylene - 5 - norbornene - 2,3 - dicarboximide in 200 parts by volume of ethanol is added 3.98 parts by weight of potassium hydroxide in 115 parts by volume of water. To this solution is added 8.14 parts by weight of dimethylsulfate. The mixture is stirred at room temperature for one hour during which time the product crystallizes. After cooling in an ice-bath for ½ hour, the product is collected on a filter, washed with aqueous alcohol and air-dried to give 15.8 parts by weight of endo-7 - o - methyldiphenylmethylene - N - methyl - 5 - norbornene-2,3-dicarboximide, melting point 161–162° C.

*Example XXXIV*

A solution of 14.68 parts by weight of endo-7-o-methyldiphenylmethylene - N - methyl - 5 - norbornene - 2,3 - dicarboximide in 800 parts by volume of anhydrous ether is added slowly to a suspension of 7.75 parts by weight of lithium aluminum hydride in 200 parts by volume of ether. The mixture is refluxed for 5 hours and allowed to stand at room temperature for 16 hours. The mixture is hydrolyzed by the slow addition of 23.2 parts by volume of water. The inorganics are removed by filtration. The ether filtrate is dried over magnesium sulfate, filtered and concentrated to dryness in vacuo. The residue is a yellow oil, 13.1 parts by weight. To 12.4 parts by weight of this oil, dissolved in ether, is added a solution of 4.34 parts by weight of maleic acid in acetone. The product crystallizes and is collected on a filter and washed with acetone-ether. There is obtained 12.6 parts by weight of endo - 8 - o - methyldiphenylmethylene - 2 - methyl - 3a, 4,7,7a - tetrahydro - 4,7 - methanoisoidoline maleate, melting at 140.5–142° C.

*Example XXXV*

To a solution of 2.3 parts by weight of sodium in 80 parts by volume of ethanol is added a solution of 12 parts by weight of acetophenone and 11.6 parts by weight of cyclopentadiene under nitrogen. After stirring for 45 minutes, the red solution is diluted with water and extracted with ether. The extracts are evaporated to dryness, affording 16 parts by weight of a red oil. The oil is purified by distillation. The product, 6-methyl-6-phenylfulvene, has a boiling point of 90–108° C. at 2.5 mm. of mercury.

*Example XXXVI*

To a solution of 1.44 parts by weight of maleimide in 30 parts by volume of benzene is added a solution of 2.5 parts by weight of 6-methyl-6-phenylfulvene in 15 parts by volume of benzene. This mixture is heated under reflux for 3 hours. The solution is evaporated to dryness in vacuo. Trituration with petroleum ether affords crystalline 7 - (α-methylbenzylidene) - 5 - norbornene - 2,3-dicarboximide which, after recrystallization from benzene, melts at 159–161° C.

*Example XXXVII*

To a solution of 6.1 parts by weight of potassium hydroxide, 180 parts by volume of water and 300 parts by volume of ethanol is added 23.4 parts by weight of 7 - (1 - phenylethylidene) - 5 - norbornene - 2,3 - dicarboximide. The mixture is warmed to achieve solution. After cooling to room temperature, 11.8 parts by weight of dimethylsulfate is added. The mixture is stirred for 2 hours at room temperature and 2 hours at reflux. The ethanol is removed in vacuo. After cooling, the product is filtered, washed with ether and dried, yielding 23.2 parts by weight of endo-N-methyl-7-(1-phenylethylidene)-5-norbornene-2,3-dicarboximide. After two recrystallizations from benzene-hexane, the pure product melts at 170–172° C.

*Example XXXVIII*

To a suspension of 6.5 parts by weight of lithium aluminum hydride in 95 parts by volume of dry tetrahydrofuran is added 9.6 parts by weight of endo-N-methyl-7-(α-methylzenzylidene)-5-norbornene-2,3-dicarboximide in 130 parts by volume of dry tetrahydrofuran. The reaction mixture is heated at reflux for 2 hours and stirred at room temperature for 18 hours. It is then decomposed by adding 20 parts by volume of water cautiously. The inorganic salts are removed by filtration and washed with ether. The total filtrate is evaporated to dryness in vacuo. The product is dissolved in ether and extracted with dilute hydrochloric acid. The acid solution is made basic and extracted with ether. The organic solution is washed with water and saturated sodium chloride solution, dried over magnesium sulfate, filtered and evaporated to dryness in vacuo, yielding 7 parts by weight of product as an oil. The oily base is dissolved in 2-propanol-ether and treated with fumaric acid. There is thus obtained a crystalline fumarate, which is recrystallized from 2-propanol-ether to give pure 3a,4,7,7a - tetrahydro - 2 - methyl-8-(α-methylbenzylidene) - 4,7 - methanoisoindoline fumarate, melting at 164–165° C.

In a similar manner, following the procedures given above and commencing with the appropriate starting material, there are prepared endo-8-phenyl-4-pyridylmethylene-2-methyl-3a,4,7,7a-tetrahydro-4,7-methanoisoindoline;
edo-8-phenyl-3-pyridylmethylene-2-methyl-3a,4,7,7a-tetrahydro-4,7-methanoisoindoline;
endo-8-phenyl-para-methoxyphenylmethylene-2-methyl-3a,4,7,7a-tetrahydro-4,7-methanoisoindoline and
8-di-para-tolylmethylene-2-methyl-3a,4,7,7a-tetrahydro-4,7-methanoisoindoline.

*Example XXXIX*

A solution of 2.30 parts by weight of diphenylfulvene and 1.11 parts by weight of N-methyl maleimide in 10 parts by volume of benzene is allowed to stand at room temperature for four days. The solution is concentrated to dryness under reduced pressure, treated with ether, and the resulting solid is collected on a filter, washed with ether, and dried to yield endo-7-diphenylmethylene-N-methyl-5-norbornene-2,3-dicarboximide, melting at 173–174° C. Concentration of the mother liquors gives an additional quantity of material.

*Example XL*

A mixture of 10 parts by weight of diphenylfulvene and 4.2 parts by weight of maleimide in 75 parts by volume of benzene is heated under reflux for two hours, cooled and diluted with ether. The crystalline product which separates is collected by filtration, washed with ether and dried. Purification by recrystallization from ethyl acetate gives endo-7-diphenylmethylene-5-norbornene - 2,3-dicarboximide, melting point 204° C. to 208° C.

*Example XLI*

A mixture of 9.2 parts by weight of diphenylfulvene and 5.6 parts by weight of N-carbamoylmaleimide in 100 parts by volume of benzene is heated under reflux for two hours. The initial deep red color of the fulvene disappears and the mixture thickens as the insoluble product separates. The mixture is cooled, diluted with ether, and filtered, and the tan product is washed with ether and dried, giving endo - 7 - diphenylmethylene-N-carbamoyl-5-norbornene-2,3-dicarboximide, melting at 200° C. to 210° C. with decomposition.

*Example XLII*

A slurry of 11.2 parts by weight of the N-carbamoylimide (supra) in 120 parts by volume of 50% aqueous ethanol is boiled for two hours and then is concentrated to low volume, cooled, and filtered. The solid product is washed with water and dried. There is obtained endo-7-diphenylmethylene-5-norbornene-2,3-dicarboximide, melting at 204° C. to 208° C. Recrystallization first from acetone and then from ethyl acetate gives the pure imide VII, melting at 208° C. to 210° C.

*Example XLIII*

To a solution of 5.2 parts by weight of 85% potassium hydroxide in 150 parts by volume of water and 250 parts by volume of methanol is added 23.6 parts by weight of endo-7-diphenylmethylene-5-norbornene - 2,3 - dicarboximide. To the resulting clear solution is added 9.95 parts by weight of dimethylsulfate dropwise with stirring. After about two minutes, a thick slurry is formed. This mixture is allowed to stand for two hours at room temperature and it is then refluxed for two hours. The ethanol is removed under reduced pressure, and the mixture is cooled and filtered, and the solid which is collected is washed with water and dried in the steam oven. There is obtained endo-7-diphenylmethylene-N-methyl-5-norbornene-2,3-dicarboximide, melting at 166° C. to 171° C. with decomposition. Recrystallization from ether affords a product melting at 176° C. to 177.5° C. (dec.).

*Example XLIV*

To 15 parts by weight of endo-7-diphenylmethylene-5-norbornene-2,3-dicarboximide almost completely dissolved in a mixture of 350 parts by volume of hot ethanol and 100 parts by volume of water containing 3.1 parts by weight of potassium hydroxide is added 4.1 parts by weight of ethylene chlorohydrin. The solution is refluxed for one hour, then treated three more times with 3.1 parts by weight of potassium hydroxide in water and 4.1 parts by weight of ethylene chlorohydrin. The treatments are separated by approximately one hour of reflux.

The resultant solution is concentrated in vacuo to remove ethanol. The aqeuous mixture is extracted with methylene chloride. The extracts are washed with water, dried over magnesium sulfate, filtered and concentrated to dryness in vacuo. The crude product is recrystallized from methylene chloride-ether, affording 12.9 parts by weight of endo-7-diphenylmethylene-N-beta-hydroxyethyl-5-norbornene-2,3-dicarboximide, melting point 171° C. to 172° C.

*Example XLV*

To a slurry of 6.1 parts by weight of lithium aluminum hydride in 500 parts by volume of redistilled tetrahydrofuran is added a solution of 12 parts by weight of endo-7 - diphenylmethylene-N-beta-hydroxyethyl-5-norbornene-2,3-dicarboximide in 400 parts by volume of tetrahydrofuran. The solution is refluxed for two hours and allowed to stand at room temperature for sixteen hours. It is then hydrolyzed by the cautious addition of 18 parts by volume of water. An additional 500 parts by volume of ether is added and the mixture is stirred in an ice-bath for one-half hour. The mixture is filtered and the inorganics washed well with ether and benzene. The filtrate is then concentrated to dryness in vacuo.

The residual oil is dissolved in methylene chloride-ether and dilute hydrochloric acid. The ether layer is separated. The acid oil and solution are combined, made basic with sodium hydroxide solution and extracted with methylene chloride. The extract is washed with water, dried over magnesium sulfate, filtered and concentrated to dryness in vacuo affording 10.2 parts by weight of an oil.

The oil is dissolved in 25 parts by volume of methanol and treated with a solution of 3.5 parts by weight of fumaric acid in 30 parts by volume of methanol. Dilution with ether and scratching affords crystals, which are filtered, washed with ether and air-dried. The crystalline product is recrystallized from ethanol yielding 6.9 parts by weight of endo-8-diphenylmethylene-3a,4,7,7a-tetrahydro-2-beta-hydroxyethyl-4,7-methanoisoindoline fumarate with a melting point of 176° C. to 179° C.

*Example XLVI*

To a slurry of 2.9 parts by weight of lithium aluminum hydride in 50 parts by volume of dried diethyleneglycol dimethylether is added a solution of 5 parts by weight of endo - 7-diphenylmethylene-5-norbornene-2,3-dicarboximide in 100 parts by volume of the same solvent. The mixture is stirred at 80° C. for two hours and at room temperature for sixteen hours. The mixture is hydrolyzed by the dropwise addition of 9 parts by volume of water. Anhydrous ether (250 parts by volume) is added and the mixture is stirred at room temperature for one hour. It is then filtered. The inorganic solids are washed well with ether and benzene and the filtrate is concentrated to dryness in vacuo. The oily product is dissolved in ether and extracted twice with 2 N hydrochloric acid. The acid solution is made basic with sodium hydroxide solution and extracted with methylene chloride-ether. The extracts are dried over magnesium sulfate, filtered and concentrated to dryness in vacuo, affording 3.5 parts by weight of oily basic product.

The base is dissolved in acetone and treated with an acetone solution of 1.36 parts by weight of maleic acid. The salt is filtered, washed with acetone-ether and dried, affording 3.3 parts by weight of endo-8-diphenylmethylene-3a,4,7,7a-tetrahydro-4,7-methanoisoidoline maleate, melting at 186.5° C. to 190 C. after two recrystallizations from ethanol.

*Examples XLVII*

To a solution of 12.35 parts by weight of endo-7-diphenylmethylene - N - methyl-5-norbornene-2,3-dicarboximide in 100 parts by volume of chloroform, cooled in an ice water-salt bath, is added a solution of 5 parts by weight of perbenzoic acid in chloroform. After standing at room temperature for thirty-six hours, the chloroform solution is washed three times with 5% sodium carbonate and once with water. It is then dried over magnesium sulfate, filtered and concentrated to dryness under reduced pressure. The product, endo-7-diphenylmethyl-7,alpha-epoxy-N-methyl-5-norbornene-2,3-dicarboximide, is obtained as white crystals from methylene chloride-ether, and shows a melting point of 181.5° C. to 182.5° C.

*Example XLVIII*

To a solution of 1 part by weight of exo-7-diphenylmethylene - N-methyl-5-norbornene-2,3-dicarboximide in 10 parts by volume of chloroform in an ice-water bath is added dropwise a solution of 0.405 part by weight of perbenzoic acid in chloroform. After standing for twenty-four hours at room temperature, the solution is washed with 5% sodium carbonate solution, dried over magnesium sulfate, filtered and concentrated to dryness under reduced pressure. The product, exo-7-diphenylmethylene-5,6 - epoxy - N - methyl-2,3-norbornene-dicarboximide, is crystallized from methylene chloride-ether, yielding 0.92 part by weight, melting point 179.5° C. to 181.5° C.

*Example XLIX*

To 2 parts by weight of endo-7-diphenylmethylene-N-methyl-2,3-norbornanedicarboximide in 20 parts by volume of chloroform at 0° C. is added 0.80 part by weight of perbenzoic acid in chloroform. After standing for two days at room temperature, the solution is washed three times with 5% sodium carbonate solution and once with water, dried over magnesium sulfate, filtered and concentrated to dryness under reduced pressure. The product, endo - 7-diphenylmethyl-7,alpha-epoxy-N-methyl-2,3-norbornanedicarboximide, is crystallized from methylene chloride-ether, affording 1.3 parts by weight, melting point 145° C. to 152° C., 177.5° C. to 180° C.

*Example L*

A 0.5 part by weight sample of endo-7-diphenylmethyl-7,alpha - epoxy - N-methyl-5-norbornene-2,3-dicarboximide is hydrogenated over 0.05 part by weight of platinum in 50 parts by volume of methanol at atmospheric pressure. After a rapid uptake of one equivalent of hydrogen, the reaction stopped. The solution is filtered and concentrated to dryness under reduced pressure. The product, endo - 7-diphenylmethyl-7,alpha-epoxy-N-methyl-2,3-norbornanedicarboximide, is crystallized from methylene chloride-ether in 100% yield, melting point 144° C. to 153° C., 176° C. to 178° C.

*Example LI*

A 2 parts by weight sample of endo-7-diphenylmethyl-7, alpha - epoxy - N-methyl-5-norbornene-2,3-dicarboximide is hydrogenated over 0.5 parts by weight of 10% palladium-on-carbon in 100 parts by volume of methanol on a shaker. After six hours, the reaction is stopped and the mixture is filtered. The catalyst is washed well with methylene chloride and the filtrate is concentrated to low volume under reduced pressure. The product is crystallized from methanol and is filtered. There is obtained 1.63 parts by weight of endo-[7-diphenylmethyl-7-hydroxy-N-methyl]-2,3-norbornanedicarboximide, melting point 276° C. to 280° C.

*Example LII*

To 0.45 part by weight of endo-[7-diphenylmethyl-7-hydroxy-N-methyl]-2,3-norbornanedicarboximide in 25 parts by volume of cold pyridine is added 0.135 part by volume of thionyl chloride, dropwise, with cooling. After standing at room temperature overnight, the solution is diluted with 50 parts by volume of water and extracted three times with chloroform. The extracts are washed with dilute acid, dilute base, and water, dried over magnesium sulfate, filtered and concentrated to dryness under reduced pressure. The product, endo-7-diphenylmethylene-N-methyl-2,3-norbornanedicarboximide, is crystallized from ether-petroleum ether, melting point 148–151° C.

*Example LIII*

To a slurry of 1.62 parts by weight of lithium aluminum hydride in 25 parts by volume of tetrahydrofuran is added a solution of 2 parts by weight of endo-7-diphenylmethyl-7,alpha - epoxy - N - methyl - 5 - norbornene - 2,3 - dicarboximide in 25 parts by volume of tetrahydrofuran. The mixture is stirred at room temperature for forty-eight hours and then hydrolyzed by the cautious addition of 5 parts by volume of water. The mixture is stirred for two hours and filtered, and the inorganics are washed thoroughly with tetrahydrofuran. The filtrate is concentrated to dryness under reduced pressure. The oily product is dissolved in ether, dried over magnesium sulfate, filtered and concentrated to dryness under reduced pressure, affording 90% of a viscous oily product.

A fumarate salt of the product is prepared in isopropyl alcohol. After one recrystallization from isopropyl alcohol, the white, crystalline fumarate of endo-8-diphenylmethyl - 3a,4,7,7a - tetrahydro - 2 - methyl - 4,7 - methanoisoindolinol shows a melting point of 217° C. to 220° C. (dec.).

*Example LIV*

To a slurry of 1.07 parts by weight of lithium aluminum hydride in 50 parts by volume of tetrahydrofuran is added a solution of 2 parts by weight of endo-7-diphenylmethyl-7,alpha - epoxy - N - methyl - 2,3 - norbornanedicarboximide in 75 parts by volume of tetrahydrofuran. After standing at room temperature for forty-eight hours, the mixture is hydrolyzed by the cautious addition of 3.1 parts by volume of water. After stirring for three hours, the mixture is filtered and the inorganics washed well with tetrahydrofuran. The filtrate is concentrated under reduced pressure. The product is dissolved in ether, dried over magnesium sulfate, filtered and concentrated to dryness under reduced pressure, affording endo-8-diphenylmethyl - 3a,4,5,6,7,7a - hexahydro - 2 - methyl - 4,7-methanoisoindolinol.

*Example LV*

To a solution of 3.7 parts by weight of lithium aluminum hydride in 35 parts by volume of tetrahydrofuran is added dropwise a solution of 7 parts by weight of endo-[7-diphenylmethyl - 7 - hydroxy - N - methyl] - 2,3 - norbornanedicarboximide in 150 parts by volume of warm tetrahydrofuran. The solution is stirred for two hours at room temperature and at reflux for forty-five minutes and then allowed to stand at room temperature overnight.

The reaction mixture is then hydrolyzed by the cautious addition of 11 parts by volume of water. The mixture is filtered and the inorganics washed well with tetrahydrofuran and benzene. The filtrate is concentrated to dryness under reduced pressure. The oily product is dissolved in methylene chloride-ether and dried over magnesium sulfate. After filtration, the solution is concentrated to dryness under reduced pressure, affording 6.6 parts by weight of oil product.

The fumarate of the oily product is prepared in methanol-ether, giving endo - [8 - diphenylmethyl-3a,4,5,6,7,7a-hexahydro - 2 - methyl - 4,7 - methano - 8 - isoindolinol]-fumarate, melting point 219° C. to 221° C. (dec.).

*Example LVI*

A sample (6.5 parts by weight) of endo-8-diphenylmethylene - 2 - methyl - 3a,4,7,7a - tetrahydro - 4,7-methanoisoindoline is dissolved in 150 parts by volume of methanol-benzene and treated with 3.7 parts by weight of methyl iodide. The solution is stirred for one hour at room temperature and fifteen minutes at reflux. The solution is concentrated in vacuo and diluted with ether. The product, endo-8-diphenylmethylene-2,2-dimethyl-3a, 4,7,7a-tetrahydro-4,7-methanoisoindolinium iodide, is filtered, washed with ether and dried, yielding 8.5 parts by weight, melting at 260° C. to 262° C. with decomposition.

*Example LVII*

To a stirring mixture of 9.4 g. (.4 mole) of magnesium turnings in 250 ml. ether, 65 g. (.4 mole) of cyclohexyl bromide is added cautiously keeping the reaction refluxing gently. The reaction is then refluxed one hour and is then cooled on ice while 28 g. (.3 mole) of 2-cyanopyridine is added cautiously. A vigorous reaction occurs and additional ether is added to aid stirring of the abundant precipitate which forms. The reaction is poured into a saturated ammonium chloride solution forming two layers. After the ether layer is decanted, the ammonium chloride solution is extracted several times with ether and the ether solutions are combined and dried with magnesium sulfate. The dried product is distilled to give, after a forerun, a liquid, B.P. 110–116° C./0.5–1.2 mm. The distillate is treated with 120 ml. of 10 percent hydrochloric acid and stirred about 15 minutes. The suspension is then extracted several times with ether and the extracts are combined, dried with magnesium sulfate and distilled under reduced pressure to yield cyclohexyl-2-pyridylketone as a pale yellow liquid. The ketone is characterized as the hydrochloride salt, M.P. 138–140° C., 230 m$\mu$($\epsilon$7,750); 267 m$\mu$($\epsilon$4,180).

*Example LVIII*

To a solution of 4.7 g. (.0712 mole) freshly distilled cyclopentadiene in sodium ethoxide (prepared by dissolving 1.13 g. of sodium in 100 ml. of absolute ethanol), 9 g. (.0476 mole) cyclohexyl-2-pyridylketone in 15 ml. of ethanol is added. The reaction is placed under refrigeration for 17 hours and then room temperature for 23 hours; the mixture is distilled under reduced pressure to yield a dark red oil which is then dissolved in ether and extracted several times with water. The ether solution is dried with magnesium sulfate and distilled under reduced pressure. A 2.05 g. (.0211 mole) quantity of maleimide is dissolved in a solution of 5 g. (.0211 mole) of the above distillate in 50 ml. of benzene. The reaction is allowed to stand at room temperature 18 hours and then refluxed 3 hours. Upon cooling a white solid is crystallized out. The product, 7-(cyclohexyl-2-pyridylmethylene)-5-norbornene-2,3-dicarboximide is recrystallized from ethyl acetate to give a white crystalline solid, M.P. 200–201° C., 235 m$\mu$ ($\epsilon$ 3,900); 262 m$\mu$ ($\epsilon$ 4,300).

*Example LIX*

To a sodium ethoxide solution prepared from .75 g. of sodium in 50 ml. of anhydrous ethanol, 2.93 g. (.044 mole) of freshly distilled cyclopentadiene and 6 g. (.029 mole) of 1-methyl-4-piperidyl phenyl ketone are added and the reaction mixture is refrigerated for 68 hours.

Removal of the solvent yields a dark residue which is dissolved in ether and washed thoroughly with water. The ether solution is then dried with magnesium sulfate and distilled under reduced pressure to remove most of the solvent. The residual oil is then dissolved in 35 ml. of benzene containing 1.66 g. (.0172 mole) of maleimide. The reaction mixture is allowed to stand at room temperature for 16 hours and is then refluxed for 4 hours. Removal of most of the solvent yields an oil which solidifies upon cooling and addition of several drops of ethanol. The solid is recrystallized from ethyl acetate to yield 7-[α-4-(1-methylpiperidyl)benzylidene]-5-norbornene-2,3-dicarboximide, M.P. 191–192° C.

Using the procedure of this example and replacing 1-methyl-4-piperidyl phenyl ketone with an equivalent amount of 1-methyl-3-piperidyl phenyl ketone, the corresponding norbornene dicarboximide is produced, namely, 7 - [α] - 3-(1-methylpiperidyl)benzylidene]-5-norbornene-2,3-dicarboximide.

Example LX

To a solution of 4.7 g. (.071 mole) freshly distilled cyclopentadiene in sodium ethoxide (prepared by dissolving 1.13 g. of sodium in 100 ml. of absolute ethanol), 8 g. (.048 mole) t-butyl-2-pyridyl ketone in 15 ml. of ethanol is added. The reaction is cooled 1½ hours and then allowed to stand at room temperature 111 hours. The reaction mixture is distilled under reduced pressure to yield an oil which is dissolved in ether and extracted several times with water. The ether solution is dried with magnesium sulfate and distilled under reduced pressure. A 3.12 g. (.0322 mole) sample of maleimide is dissolved in a solution of 7.7 g. of the above distillate in 50 ml. of benzene. The reaction is allowed to stand at room temperature 19½ hours and then heated on a steam bath for 1 hour to yield a whilte crystalline precipitate which is recrystallized from ethyl acetate-methanol to yield a white solid, 7-(t-butyl-2-pyridylmethylene)-5-norbornene-2,3-dicarboximide, M.P. 248–249° C., 256 mμ (ε 3,700); 261 mμ (ε 4,200); 267 mμ (ε 3,400).

Example LXI

A Grignard reagent is prepared from 100 g. (0.61 mole) of 2-bromothiophene and 14.8 g. (0.62 mole) of magnesium in 300 ml. of ether. The solution is treated with a solution of 63.4 g. (0.61 mole) of 2-cyanopyridine in 200 ml. of ether. The reaction is vigorous and the mixture becomes dark. After one half the nitrile solution is added, the reaction mixture is treated with 200 ml. of benzene. An additional 150 ml. of ether is added, followed by the remainder of the nitrile solution. The reaction mixture is hydrolyzed with ammonium chloride solution and is then acidified with hydrochloric acid. The organic layer is separated. The aqueous layer is neutralized with dilute sodium hydroxide and extracted with ether. Both ether solutions are dried and the ether is distilled off in vacuo. The two oily residues are identical by infrared spectrum comparison. The oily products are combined and distilled in vacuo to give 2-pyridyl-2-thienyl ketone, B.P. 148–153° C.

Example LXII

Using the procedure of Example XXIV and replacing 2-benzoyl-pyridine with equivalent amounts of 2-pyridyl-2-thienyl ketone, di-2-pyridyl ketone, di-4-1-methyl piperidyl ketone, 2-propionyl thiophene, 4-1-methyl piperidyl-t-butyl ketone, dicyclohexyl ketone, di-2-thienyl ketone and 4-propionyl-1-methyl piperidine, the corresponding norbornene-dicarboximides are produced, namely, 7-(2 - pyridyl - 2-thienylmethylene)-5-norbornene-2,3-dicarboximide, 7 - di-2-pyridylmethylene-5-norbornene-2,3-dicarboximide, 7-(2-thienyl)propylidene-5-norbornene-2,3-dicarboximide, 7-[1-(4-methyl piperidyl)-(t-butyl)methylene-5-norbornene-2,3 - dicarboximide, 7 - dicyclohexylmethylene-5-norbornene-2,3-dicarboximide, 7-di-(2-thienyl)methylene-5-norbornene-2,3-dicarboximide and 7-[1-(4 - methylpiperidyl)propylidene] - 5-norbornene-2,3-dicarboximide.

Example LXIII

To sodium ethoxide solution (from 3.6 g. of sodium and 200 ml. of ethanol) is added 9.9 g. (0.15 mole) of cyclopentadiene. To the resulting solution is added 5.5 g. of 3-benzoylpyridine (0.03 mole) dissolved in 120 ml. of ethanol over a period of 2 hours at room temperature. One hour after the addition is complete, the solution is concentrated to one-half its volume, diluted with water and extracted with ether. The ether solution is concentrated under vacuum and reacted with 3 g. of maleimide by refluxing in 100 ml. of benzene overnight. Removal of the solvent leaves a residue which is crystallized by trituration with ethyl acetate and recrystallized from ethyl acetate-cyclohexane to give the product 7-(α-3-pyridylbenzylidene)-5-norbornene-2,3-dicarboximide as white crystals, M.P. 172–173° C.

By the same procedure one obtains 7-(α-4-pyridylbenzylidene)-5-norbornene-2,3-dicarboximide, M.P. 190–191° C., using 4-benzoylpyridine instead of 3-benzoylpyridine; and in the same manner, 7-(α-2-pyridylbenzylidene)-5-norbornene-2,3-dicarboximide, using 2-benzoylpyridine.

Example LXIV

To 200 ml. of absolute ethanol containing 1.2 g. (0.052 g. atom) of dissolved sodium is added 16.42 g. (0.05 mole) of 7-(α-pyridylbenzylidene) - 5-norbornene-2,3-dicarboximide. The resultant slurry is warmed on a steam bath until solution is complete (CaCl₂ tube) at which time the flask is cooled in ice-water and 10.35 g. (0.052 mole) of 2-bromoacetophenone is added in one portion with swirling. The homogeneous solution is allowed to stand at room temperature for 72 hours. The resultant crystals (fine needles) are collected and dried; M.P., 172–174° C. The product is N-phenacyl - 7 - (α-2-pyridylbenzylidene)-5-norbornene-2,3-dicarboximide.

Example LXV

To 350 ml. of absolute ethanol containing 5.51 g. (0.24 g. atom) of dissolved sodium is added 32.8 g. (0.1 mole) of 7-(α-2-pyridylbenzylidene)-5-norbornene-2,3-dicarboximide. To the resultant solution is added 20.2 g. (0.14 mole) of 2-dimethylaminoethyl chloride hydrochloride in one portion. There is an immediate separation of sodium chloride. The reaction mixture is refluxed for 24 hours, cooled, filtered from inorganics and the solvent is removed in vacuo. The resultant yellow sirup is taken up in benzene, filtered (Super-Cel) and the benzene is removed. After taking up in methanol, concentration and cooling, the product, N-(2-N,N-dimethylaminoethyl)-7 - (α-2-pyridylbenzylidene)-5-norbornene - 2,3-dicarboximide is recovered as crystals. After two recrystallizations, the melting point is 149–153° C.

Example LXVI

Using the procedure of Example XXIV, replacing maleimide with an equivalent amount of N-carbamoyl maleimide and replacing 2-benzoyl pyridine with equivalent amounts of di-2-pyridyl ketone, di-2-thienyl ketone, 4-propionyl-1-methylpiperidine and acetophenone, the corresponding N-carbamoyl norbornene dicarboximides are formed, namely, 7-di-2-pyridylmethylene-N-carbamoyl-5-norbornene-2,3-dicarboximide, 7-di-2-thienylmethylene-N-carbamoyl-5-norbornene-2,3-dicarboximide, 7-[1-(4-methylpiperidyl)propylidene] - N-carbamoyl-5-norbornene-2,3-dicarboximide and 7-phenyl-(1-ethylidene)-N-carbamoyl-5-norbornene-2,3-dicarboximide.

Example LXVII

Using the procedure of Example XXXIX and replacing N-methylmaleimide with an equivalent amount of N-benzylmaleimide, the product obtained is endo-7-diphenylmethylene-N-benzyl-5-norbornene-2,3-dicarboximide.

Example LXVIII

Using the procedure of Example XXXIII and replacing dimethyl sulfate with diethyl sulfate, the product obtained is endo - 7 - o - methyldiphenylmethylene-N-ethyl-5-norbornene-2,3-dicarboximide.

Example LXIX

Using the procedure of Example XLIV and replacing ethylene chlorohydrin with an equivalent amount of propylene chlorohydrin, the product obtained is endo-7-diphenylmethylene - N - β-hydroxypropyl-5-norbornene-2,3-dicarboximide.

Example LXX

Using the procedure of Example XLIV and replacing ethylene chlorohydrin with equivalent amounts of β-methoxyethyl chloride, β-ethoxypropyl chloride and chloromethyl ether, the products obtained are endo-7-diphenylmethylene-N-β-methoxyethyl - 5 - norbornene-2,3-dicarboximide, endo-7-diphenylmethylene - N - β-ethoxypropyl-5 - norbornene-2,3 - dicarboximide and endo-7-diphenylmethylene-N-methoxymethyl - 5 - norbornene - 2,3 - dicarboximide.

Example LXXI

Using the procedure of Example XVI and replacing the norbornene-2,3-dicarboximide with equivalent amounts of 7-(phenyl - 2 - pyridylmethylene) - 5-norbornene-2,3-dicarboximide, 7 - di - 2 - pyridylmethylene-5-norbornene-2,3 - dicarboximide and 7 - di - N-methyl-4-piperidylmethylene - 5 - norbornene - 2,3-dicarboximide, the products obtained are the corresponding norbornane - 2,3-dicarboximides, namely, 7 - phenyl - 2 - pyridylmethylnorbornane - 2,3 - dicarboximide, 7 - di-2-pyridylmethylnorbornane - 2,3 - dicarboximide and 7 - di-(4-methylpiperidyl)methyl-norbornane-2,3-dicarboximide.

Example LXXII

By the procedure of Example LXIV and using in place of 7 - (α - 2 - pyridylbenzylidene)-5-norbornene-2,3-dicarboximide equivalent amounts of 7 - diphenylmethylene-5 - norbornene - 2,3 - dicarboximide, 7 - diphenylmethylnorbornane - 2,3 - dicarboximide, 7 - m - trifluoromethyldiphenylmethylene - 5 - norbornene - 2,3 - dicarboximide, and 7 - cyclohexyl - 2 - pyridylmethylene - 5 - norbornene-2,3-dicarboximide, the corresponding N-phenacyl derivatives are obtained, namely 7 - diphenylmethylene - N-phenacyl - 5 - norbornene - 2,3 - dicarboximide, 7 - diphenylmethyl - N - phenacyl - norbornane - 2,3 - dicarboximide, 7 - m - trifluoromethyldiphenylmethylene - N-phenacyl-5-norbornene-2,3 - dicarboximide, and 7-cyclohexyl-2-pyridylmethylene-N-phenacyl-5-norbornene - 2,3-dicarboximide.

Example LXXIII

Using the procedure of Example LXV and replacing the norbornene-2,3-dicarboximide with equivalent amounts of 7 - diphenylmethylene - 5 - norbornene-2,3-dicarboximide, 7 - diphenylmethyl - norbornane - 2,3 - dicarboximide, 7 - m - trifluoromethyldiphenylmethylene - 5 - norbornene-2,3 - dicarboximide, and 7 - cyclohexyl - 2 - pyridylmethylene - 5 - norbornene - 2,3 - dicarboximide, the corresponding N - (2 - N,N - dimethylaminoethyl) derivatives are obtained, namely, N - (2 - dimethylaminoethyl) - 7-diphenylmethylene - 5 - norbornene - 2,3 - dicarboximide, N - (2 - dimethylaminoethyl) - 7 - diphenylmethyl-norbornane - 2,3 - dicarboximide, N - (2 - dimethylaminoethyl) - 7 - m - trifluoromethyldiphenylmethylene - 5 - norbornene - 2,3 - dicarboximide, and N - (2 - dimethylaminoethyl) - 7 - cyclohexyl - 2-pyridylmethylene-5-norbornene-2,3-dicarboximide.

What is claimed is:

1. 7-diphenylmethylene - 5 - norbornene-N-methyl-2,3-dicarboximide.

2. 7-diphenylmethylene - N - β-phenethyl-5-norbornene-2,3-dicarboximide.

3. 7-diphenylmethylene - N - methyl-2,3-norbornane dicarboximide.

4. 7-diphenylmethyl - N - methyl-2,3-norbornane dicarboximide.

5. 7-p-chlorodiphenylmethylene - 5 - norbornene-2,3-dicarboximide.

6. 7-(α-2-pyridylbenzylidene) - 5 - norbornene-2,3-dicarboximide.

7. 7-m-trifluoromethyldiphenylmethylene - N - methyl-5-norbornene-2,3-dicarboximide.

8. 7-o-methyldiphenylmethylene - 5 - norbornene-2,3-dicarboximide.

9. 7-(α-methyl-benzylidene) - 5 - norbornene-2,3-dicarboximide.

10. 7 - diphenylmethylene - N - carbamoyl-5-norbornene-2,3-dicarboximide.

11. 7-diphenylmethylene - N - β - hydroxyethyl-5-norbornene-2,3-dicarboximide.

12. 7-diphenylmethylene - 5,6 - epoxy-N-methyl-2,3-norbornenedicarboximide.

13. 7-diphenylmethyl - 7 - α - epoxy-N-methyl-2,3-norbornanedicarboximide.

14. [7 - diphenylmethyl - 7 - hydroxy-N-methyl]-2,3-norbornanedicarboximide.

15. 7 - (cyclohexyl - 2 - pyridylmethylene)-5-norbornene-2,3-dicarboximide.

16. 7-[α-4-(1-methylpiperidyl)benzylidene] - 5 - norbornene-2,3-dicarboximide.

17. 7-(t-butyl - 2 pyridylmethylene) - 5 - norbornene-2,3-dicarboximide.

18. 7-(2-pyridyl - 2 - thienylmethylene) - 5 - norbornene-2,3-dicarboximide.

19. 7-di-2-pyridylmethylene - 5 - norbornene - 2,3-dicarboximide.

20. 7-(α-3-pyridylbenzylidene) - 5 - norbornene - 2,3-dicarboximide.

21. 7-(α-2-pyridylbenzylidene) - 5 - norbornane-2,3-dicarboximide.

22. N-phenacyl - 7 - (α-2-pyridylbenzylidene)-5-norbornene-2,3-dicarboximide.

23. A norbornene(ane) dicarboximide having a formula selected from the group consisting of

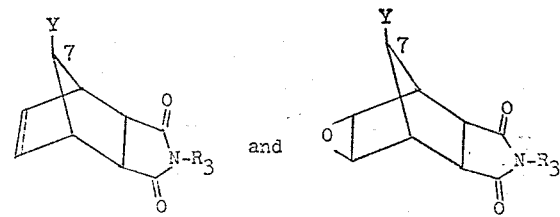

wherein Y is a member selected from the group consisting of

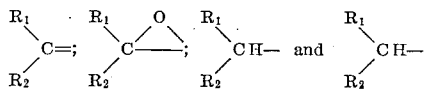

wherein the 7-carbon of the norbornene(ane) is further substituted with hydroxyl; $R_1$ is a member selected from the group consisting of phenyl, lower alkylphenyl, halophenyl, trifluoromethylphenyl and cyclohexyl; $R_2$ is a member selected from the group consisting of loweralkyl, phenyl, loweralkylphenyl, halophenyl, trifluoromethylphenyl and cyclohexyl; $R_3$ is a member selected from the group consisting of hydrogen, loweralkyl, loweralkoxyloweralkyl, monohydroxylloweralkyl, benzyl, phenethyl, carbamoyl, diloweralkylaminoloweralkyl and phenacyl.

24. A norbornene(ane) dicarboximide having a formula selected from the group consisting of

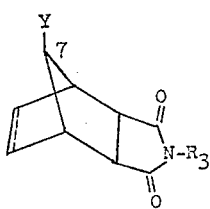 and 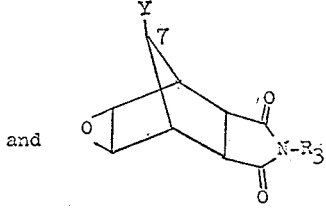

wherein Y is a member selected from the group consisting of

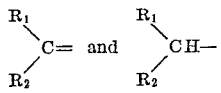

$R_1$ is a member selected from the group consisting of loweralkyl, phenyl, loweralkylphenyl, halophenyl, trifluoromethylphenyl and cyclohexyl; $R_2$ is a member selected from the group consisting of pyridyl, piperidyl and N-loweralkyl-piperidyl; $R_3$ is a member selected from the group consisting of hydrogen, loweralkyl, loweralkoxyloweralkyl, monohydroxyloweralkyl, benzyl, phenethyl, carbamoyl, diloweralkylaminoloweralkyl and phenacyl.

25. A norbornene(ane) dicarboximide having a formula selected from the group consisting of

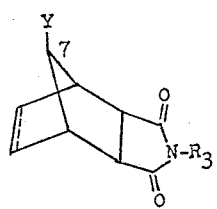 and 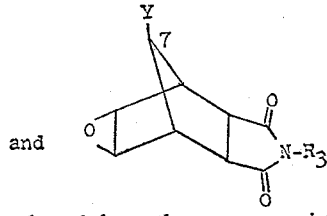

wherein Y is a member selected from the group consisting of

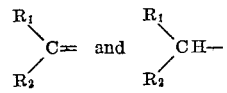

$R_1$ and $R_2$ each is a member selected from the group consisting of pyridyl, piperidyl and N-loweralkylpiperidyl; $R_3$ is a member selected from the group consisting of hydrogen, loweralkyl, loweralkoxyloweralkyl, monohydroxyloweralkyl, benzyl, phenethyl, carbamoyl, diloweralkylaminoloweralkyl and phenacyl.

26. A norbornene(ane) dicarboximide having a formula selected from the group consisting of

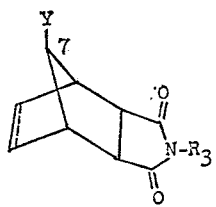 and 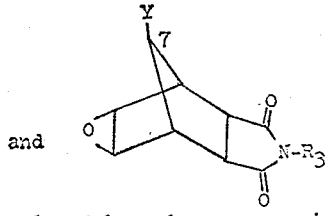

wherein Y is a member selected from the group consisting of

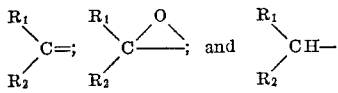

wherein the 7-carbon of the norbornene(ane) is further substituted with hydroxyl; $R_1$ is a member selected from the group consisting of loweralkyl, phenyl, loweralkylphenyl, halophenyl, trifluoromethylphenyl and cyclohexyl; $R_2$ is thienyl; $R_3$ is a member selected from the group consisting of hydrogen, loweralkyl, loweralkoxyloweralkyl, monohydroxyloweralkyl, benzyl, phenethyl, carbamoyl, diloweralkylaminoloweralkyl and phenacyl.

27. A nonbornene(ane) dicarboximide having a formula selected from the group consisting of

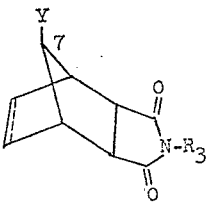 and 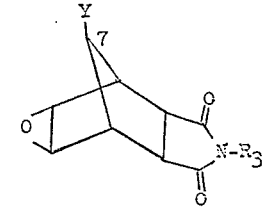

wherein Y is a member selected from the group consisting of

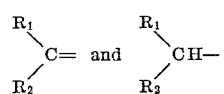

$R_1$ and $R_2$ each is thienyl; $R_3$ is a member selected from the group consisting of hydrogen, loweralkyl, loweralkoxyloweralkyl, monohydroxyloweralkyl, benzyl, phenethyl, carbamoyl, diloweralkylaminoloweralkyl and phenacyl.

28. A norbornene(ane) dicarboximide having a formula selected from the group consisting of

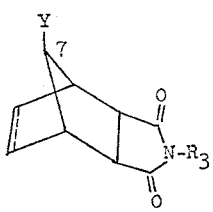 and 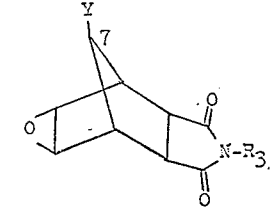

wherein Y is a member selected from the group consisting of

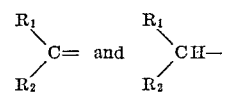

$R_1$ is a member selected from the group consisting of pyridyl and N-loweralkylpiperidyl; $R_2$ is thienyl; $R_3$ is a member selected from the group consisting of hydrogen, loweralkyl, loweralkoxyloweralkyl, monohydroxyloweralkyl, benzyl, phenethyl, carbamoyl, diloweralkylaminoloweralkyl and phenacyl.

References Cited by the Examiner

Chemical Abstracts Indexing Volumes 41–50, 1947–1956, pp. 9R and 12R.
Fifth Decennial Index, Subject Index A–AZ.

ALEX MAZEL, *Primary Examiner.*

N. S. RIZZO, *Examiner.*

J. TOVAR, *Assistant Examiner.*

UNITED STATES PATENT OFFICE
CERTIFICATE OF CORRECTION

Patent No. 3,311,634                                                March 28, 1967

George Ireland Poos

It is hereby certified that error appears in the above numbered patent requiring correction and that the said Letters Patent should read as corrected below.

Column 1, line 50, for "ispropoxy" read -- isopropoxy --; column 3, line 18, for "are defined" read -- are as defined --; column 5, line 31, for "liquor" read -- liquors --; column 6, line 35, for "parts of xylene" read -- parts by volumn of xylene --; column 11, line 49, for "3.25" read -- 3.35 --; column 13, line 70, for "methylzenzylidene" read -- methylbenzylidene --; column 14, line 19, for "edo" read -- endo --; column 16, line 14, for "190 C." read -- 190° C. --; line 16, for "Examples" read -- Example --; column 18, line 6, for "oil" read -- oily --; column 19, line 18, for "7-[α]-3-" read -- 7-[α-3- --; column 20, line 29, for "(α-pyridylbenzylidene)" read -- (α-2-pyridylbenzylidene) --.

Signed and sealed this 14th day of November 1967.

(SEAL)
Attest:

EDWARD M. FLETCHER, JR.                                EDWARD J. BRENNER
Attesting Officer                                      Commissioner of Patents